United States Patent [19]

Yasuda

[11] Patent Number: 4,772,239
[45] Date of Patent: Sep. 20, 1988

[54] SEALING APPARATUS FOR PICTURE TUBE
[75] Inventor: Koichi Yasuda, Yotsukaido, Japan
[73] Assignee: Hitachi, Ltd., Tokyo, Japan
[21] Appl. No.: 3,025
[22] Filed: Jan. 13, 1987
[51] Int. Cl.$^4$ .............................................. H01J 9/26
[52] U.S. Cl. .......................................... 445/67; 65/36
[58] Field of Search ............... 445/67, 66, 71; 65/36, 65/54

[56] References Cited

U.S. PATENT DOCUMENTS

| | | | |
|---|---|---|---|
| 1,872,070 | 8/1932 | McCabe | 65/54 |
| 3,594,059 | 7/1971 | Holz | 445/67 |
| 4,561,874 | 12/1985 | Colacello | 65/36 |
| 4,586,945 | 5/1986 | Sawicki | 65/36 |
| 4,618,355 | 10/1986 | Otto | 65/36 |
| 4,731,040 | 3/1988 | Tominaga et al. | 65/36 |

Primary Examiner—Kurt Rowan
Attorney, Agent, or Firm—Antonelli, Terry & Wands

[57] ABSTRACT

There is disclosed a sealing apparatus for picture tubes which includes a heater unit. This heater unit is located outside an index table, having bulb holders for retaining the glass bulb, during rotation of the table and is moved onto the table during a halt of the rotation. A bulb neck portion is encompassed with the heater unit to be heated by this unit. In this sealing apparatus for picture tubes, it is feasible to rapidly heat process the bulb neck portion without undergoing influences of external disturbances, whereby sealing of high quality can be obtained.

5 Claims, 5 Drawing Sheets

FIG. 5
PRIOR ART
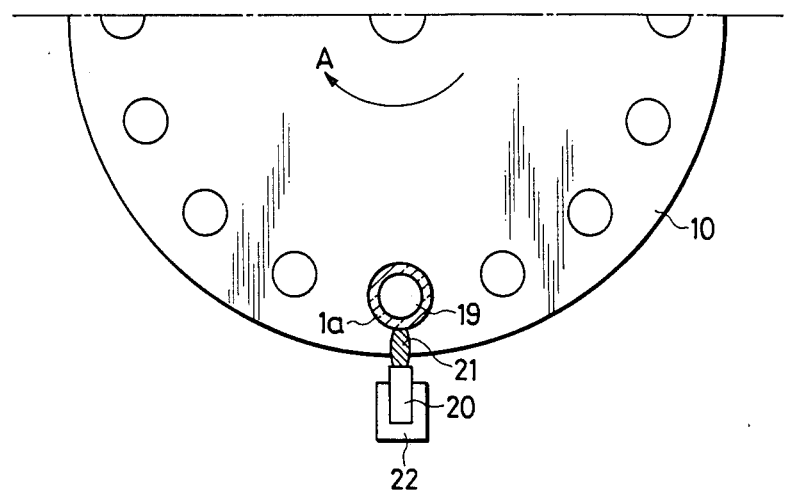
FIG. 6a
PRIOR ART
FIG. 6b
PRIOR ART
FIG. 6c
PRIOR ART
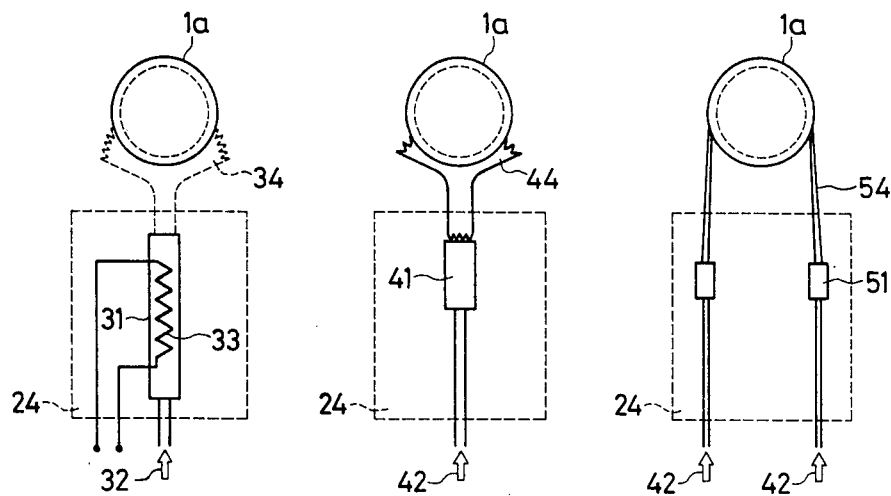

SEALING APPARATUS FOR PICTURE TUBE

BACKGROUND OF THE INVENTION

The present invention relates to a sealing apparatus for picture tubes which seals a glass bulb including a phosphor screen formed therein and a stem structure mounted with an electron gun structure.

Generally speaking, in the process of manufacturing a color picture tube, the phosphor screen, a graphite electrode and a shadow mask are provided inside the glass bulb. Subsequently, the stem structure mounted with the electron gun structure is sealed at the opening end of a glass bulb neck portion. This kind of sealing method is disclosed in the specification of Japanese Patent Publication No. 31595/1978. The sealing operation of the thus constructed picture tube requires a sealing apparatus for the picture tube which will be explained as follows.

FIG. 2 is a construction diagram in plan of the principal portion of one example of a commonly used sealing apparatus for the picture tubes. It can be observed from the figure that a plurality of bulb holders 11 for holding, with the tube-axis being centered, the above-described glass bulb are regularly disposed with equal spacings on the outer peripheral portion of a disclike index table 10. These bulb holders 11 are rotated together with the index table 10 at a predetermined velocity and pitch in the direction indicated by an arrow A by means of an automatic driving device (not illustrated). More particularly, the bulb holders 11 are moved to specified positions at given intervals in a highly accurate manner by an index driving device (not illustrated). The respective bulb holders 11 disposed on the index table 10 are usually brought into a state of installing and removing the glass bulb in positions #1 and #2 of FIG. 2. The neck portion and the sealing portion are preheated in positions #3 to #8; the bulb neck portion is welded in a position #9; fusion-cutting is effected in a position #10; slow cooling is carried out in positions #11 to #15; and a piece of neck tube (ordinarily referred to as cullet glass) separated from the bulb neck portion by the aforementioned fusion-cutting is removed in a position #16.

FIG. 3 is a side view showing the principal portion of the well known bulb holder 11 described in FIG. 2. In the Figure, the bulb holder 11 is arranged such that a glass bulb 1 including the phosphor screen, the graphite electrode and the shadow mask which are formed therein is fixed in a retainable manner to a present reference spot by a bulb holder unit 17 consisting of a bulb stopper 12, a panel chuck 13, a bulb support 14, a holder frame 15 and a bulb holder 16, etc., and this bulb holder unit 17 is likewise supportingly fixed onto the index table 10 by a support 18. With the tube-axis being centered, beneath the bulb holder unit 17 is disposed a mount pin 19 equipped with a stem structure 3 mounted with an electron gun structure 2. This mount pin 19 causes the stem structure 3 to be driven both in the rotational direction and in the vertical direction.

In such a configuration, the stem structure 3 on which the electron gun structure 2 is loaded is installed on the mount pin 19 in a roughly adjusted state and is then raised to be inserted in a bulb neck portion 1a. The electron gun structure 2 is positioned at a predetermined height by slightly adjusting the mount pin 19 in the rotational and vertical directions. In addition, an outer peripheral surface of the neck portion 1a, corresponding to the same height as a stem glass 3a of the stem structure 3 is, as illustrated in FIG. 4, heated with flames 21 generated by gas burners 20. As depicted by solid lines, the neck portion 1a and the stem glass 3a are welded to each other, thereby sealing these two members. At the same instant, cullet glass 1a', which is suspended down from the thus welded portion, of the neck portion 1a is melted and separated. At this time, the thus melted and separated cullet glass 1a' remains on a mount pin base 19a of the mount pin 19. The reference symbol 3b stands for an exhaust tube.

In the above-described sealing apparatus, a heating system 22 (hereinafter referred to as a working head) designed for glass processing which is equipped with the gas burners 20 shown in FIG. 5 or with a hot air heater unit that will be mentioned later is fixedly so disposed outside the index table 10 as to make this working head 22 apart from the mount pin 19 in order not to come in contact with the index table 10. In this type of apparatus, where, for instance, working heads illustrated in FIGS. 6a, 6b and 6c are employed, a hot air 34 or burner flames 44, 54 do not impinge precisely upon the neck portion 1a in some cases because of disturbances of airflow in the circumference thereof. When instantaneous heating is needed, it is feasible to effect heat processing with high efficiency for a short period of time by heating simultaneously the overall periphery of the neck portion. The above-mentioned apparatus is, however, defective in that it is difficult to reduce the heating time and still provide a high yield effect on account of the heating operation being performed from one side alone of the neck portion. In the conventional apparatus, as described above, the heating spot of the bulb neck portion 1a is apt to undergo influences such as external disturbances and hence highly accurate heat processing becomes impossible. Concomitantly, it is also difficult to increase the heating rate.

cullettless neck portion so formed as to shorten a neck length without providing a brimlike opening end portion at the tip of the glass bulb neck portion 1a, or in its sealing apparatus, when adopting the above-described conventional burner processing system, it is difficult to melt down the tip alone of the neck portion in a short time with a high degree of accuracy and at the same time preventing the flames from heating the metallic lead wires which support the electron gun.

FIGS. 6(a) to 6(c) are schematic plan views each showing a conventional working head 24. The working heads 24 shown in FIGS. 6(a), 6(b) are prepared for preheating and annealing processes. On the other hand, the working head 24 shown in FIG. 6(c) is used for a glass softening process. In FIG. 6(a), such is the situation that a high pressure gas introduced in the direction indicated by an arrow 32 passes through a hot air heater unit composed of a heater 33 and a cylinder 31, in which unit the gas is changed into a hot air jet 34 for heating the neck portion 1a. In FIG. 6(b), a mixture of natural gas and air fed in the direction pointed by an arrow 42 passes through a gas air burner 41 where the mixture is converted into a soft flame 44 which heats the neck portion 1a. In FIG. 6(c), a mixture of the natural gas and oxygen which is introduced in the directions indicated by the arrows 42 does through oxygen burners 51 where the mixture is converted into a hard flames 54 so as to heat the neck portion 1a. In each of the aforecited conventional working heads, it is unfeasible to uniformly heat the overall periphery of the glass bulb neck portion 1a, simultaneously thereby resulting in a difficult to perform instantaneous heating operation. Furthermore, it is impossible to effect the heat processing with high accuracy because of the external disturbances being present, since the burners or the hot air heater unit are/is disposed considerably apart from the neck portion 1a.

SUMMARY OF THE INVENTION

It is a primary object of the present invention to provide a sealing apparatus for picture tubes which is capable of effecting heat processing in a highly precise manner without undergoing influences caused by external disturbances or the like.

To this end, in the present invention, there is provided a sealing apparatus for picture tubes which has at least: a driver part for moving working heads outside an index table before or the very moment the index table begins to rotate and for moving the same heads onto a position over the index table after a halt of rotation during indexing; and a heater unit, driven by the driver part, which surrounds substantially the overall periphery of a bulb neck portion of each picture tube so as to heat this neck portion during the halt of rotation of the index table.

In other words, in the present invention, there is provided a sealing apparatus for picture tubes which includes at least: bulb holders for holding, with the tube-axis being centered, glass bulbs; an index table mounted with a plurality of the bulb holders disposed on the outer peripheral portion thereof with equal spacings, this index table rotationally moving at a specified pitch in a given direction; mount pins disposed on the index table and respectively equipped with a stem structure which is inclusive of an electron gun structure loaded thereon and of a discharging pipe provided thereunder; and working heads each for heat-processing both the stem structure and a glass bulb neck portion, these working heads each being provided with a driver part for moving the heater unit outside the index table before or immediately when this table starts rotating and for moving the same unit onto a position over the table soon after the table ceases to rotate and with the foregoing heater unit, driven by the driver part, which surrounds substantially the entire periphery of the bulb neck portion so as to heat this neck portion during the halt of rotation of the table.

In the thus constructed sealing apparatus for picture tubes according to the present invention, the heater unit surrounds substantially the entire periphery of the bulb neck portion so that this unit is capable of heat-processing the bulb neck portion uniformly with high efficiency in a short time during the halt of rotation of the index table and without undergoing influences by external disturbances.

BRIEF DESCRIPTION OF THE DRAWINGS

FIG. 5 is a schematic plan view showing a positional relation between a conventional working head and an index table;

FIGS. 6a to 6c are schematic plan views each showing the conventional working head;

DESCRIPTION OF THE PREFERRED EMBODIMENTS

The embodiments of the present invention will hereinafter be described at full length with reference to the accompanying drawings.

Figure 1:
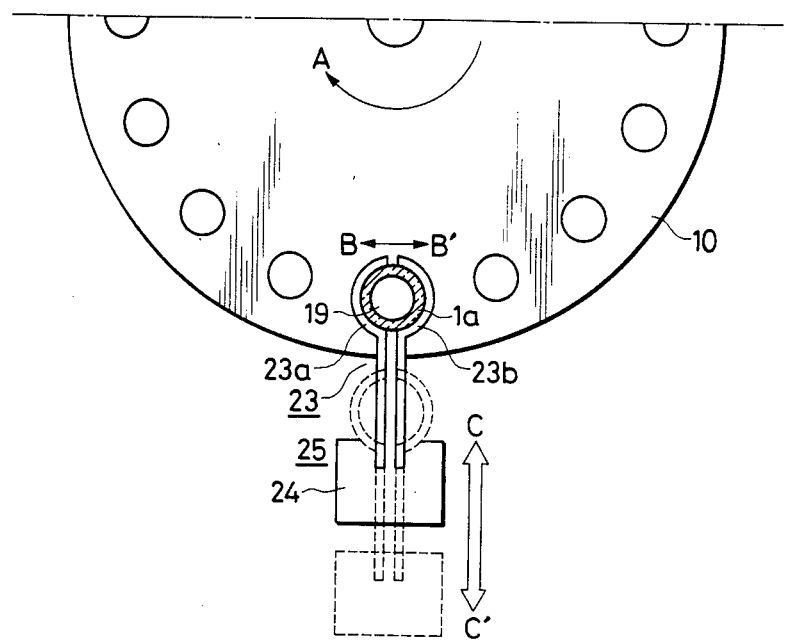
FIG. 1 is a construction diagram in plan, showing the principal portion of one embodiment of a sealing apparatus for picture tubes according to the present invention.
Figure 2:
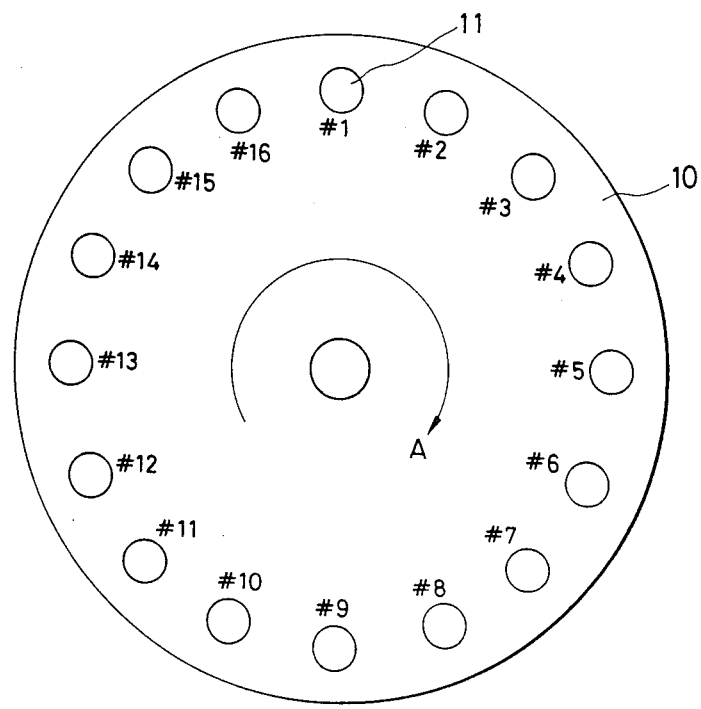
FIG. 2 is a plan view showing a conventional sealing apparatus for picture tubes.

FIG. 1 is a construction diagram in plan, showing the principal portion of a sealing apparatus for picture tubes according to the present invention. The same components as those of the foregoing Figures are marked with the same symbols. In FIG. 1, a plurality of mount pins 19 are disposed with equal spacings on the outer peripheral portion of an index table 10, these mount pins 19 being driven both in the vertical direction and in the rotational direction. On the outside of the index table 10 and of the mount pin 19 for preheating a sealing portion of a bulb neck portion 1a is disposed a working head 25 equipped with a heater unit 23 which moves to and fro in the directions pointed by arrows C, C' when the index table 10 begins to rotate and ceases to rotate, and with a driver part 24 for driving the heater unit 23. The working head 25 is composed of the heater unit 23 and the driver part 24; the heater unit 23 consists of a first semicircular block heater 23a which has an inside diameter substantially identical with an outside diameter of the bulb neck portion 1a and opens and closes in the directions (a direction of a tangential line to the outer periphery of the index table) indicated by arrows B, B' and of a second block heater 23b; and the driver part 24 is capable of moving back and forth together with the heater unit 23 in the directions indicated by the arrows C, C' and has a thermal adjuster for adjusting the temperature of the heater unit 23 to predetermined values of from 600° C. to 800° C.

Figure 7:
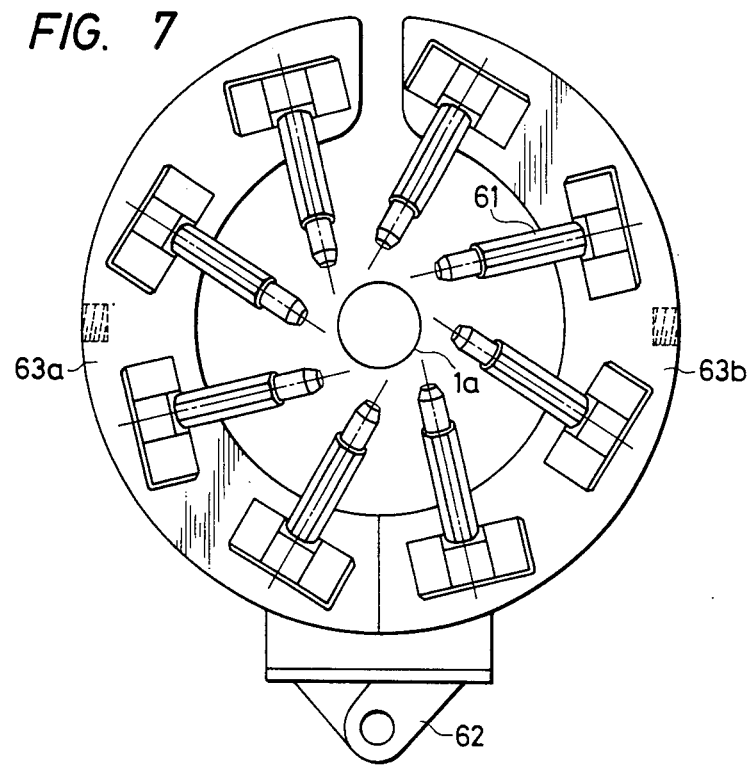
FIG. 7 is a schematic explanatory view of a block heater of one embodiment of the present invention.
Figure 8:
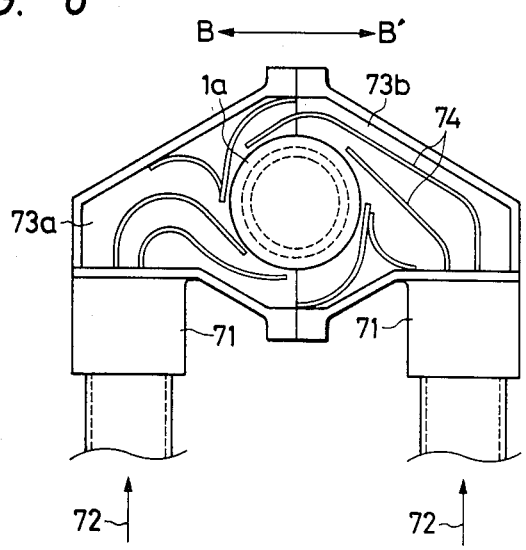
FIG. 8 is a schematic explanatory view showing the inside of the block heater of another embodiment of the present invention.

FIGS. 7 and 8 show examples of the heater units. Referring to FIG. 7, there is shown a configuration of the heater unit wherein the neck portion 1a is encompassed with eight pieces of burners 61. This type of heater unit can be separated into a first block heater 63a and a second block heater 63b by means of a hinge 62. FIG. 8 shows the inside of another heater unit. In this heater unit, the air introduced in the direction pointed by an arrow 72 is heated up to high temperatures in a gas heating member 71 and is then guided by blades 74, thereby blown on the neck portion 1a. This kind of heater unit can likewise be separated into a first block heater 73a and a second block heater 73b in the directions indicated by arrows B, B'.

Figure 3:
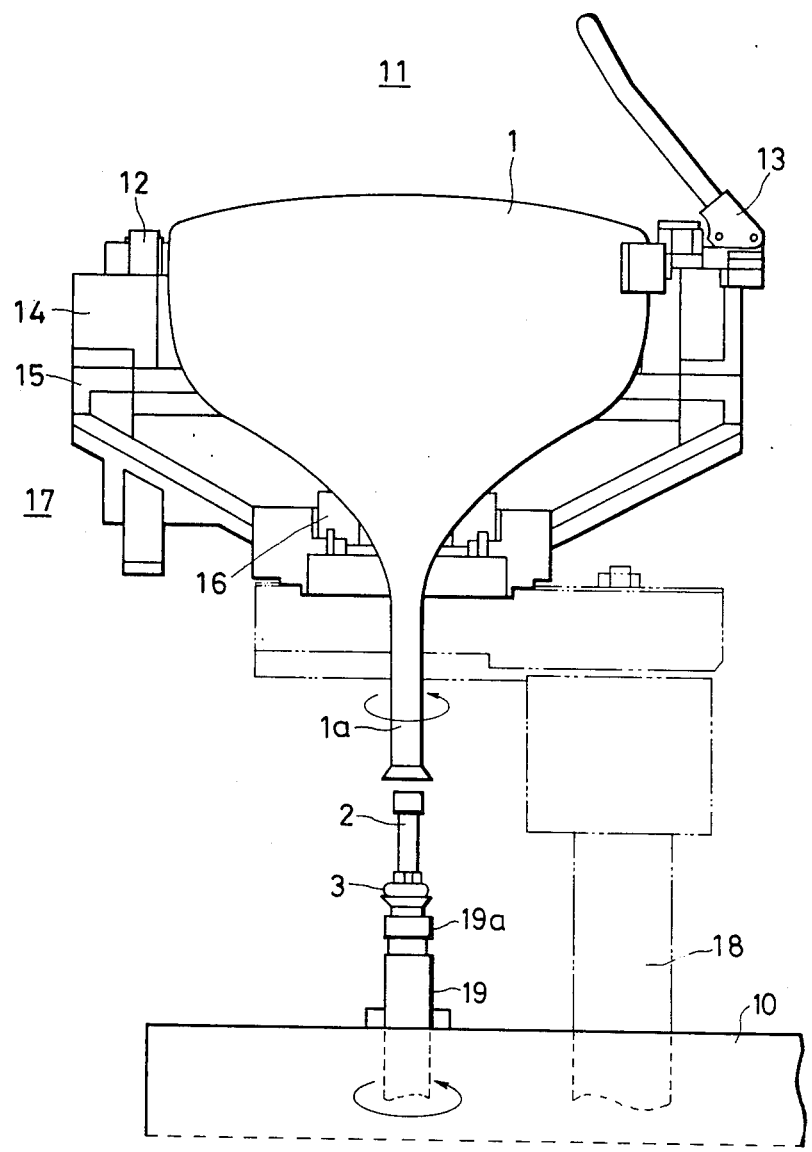
FIG. 3 is a side view of the principal portion of a bulb holder.
Figure 4:
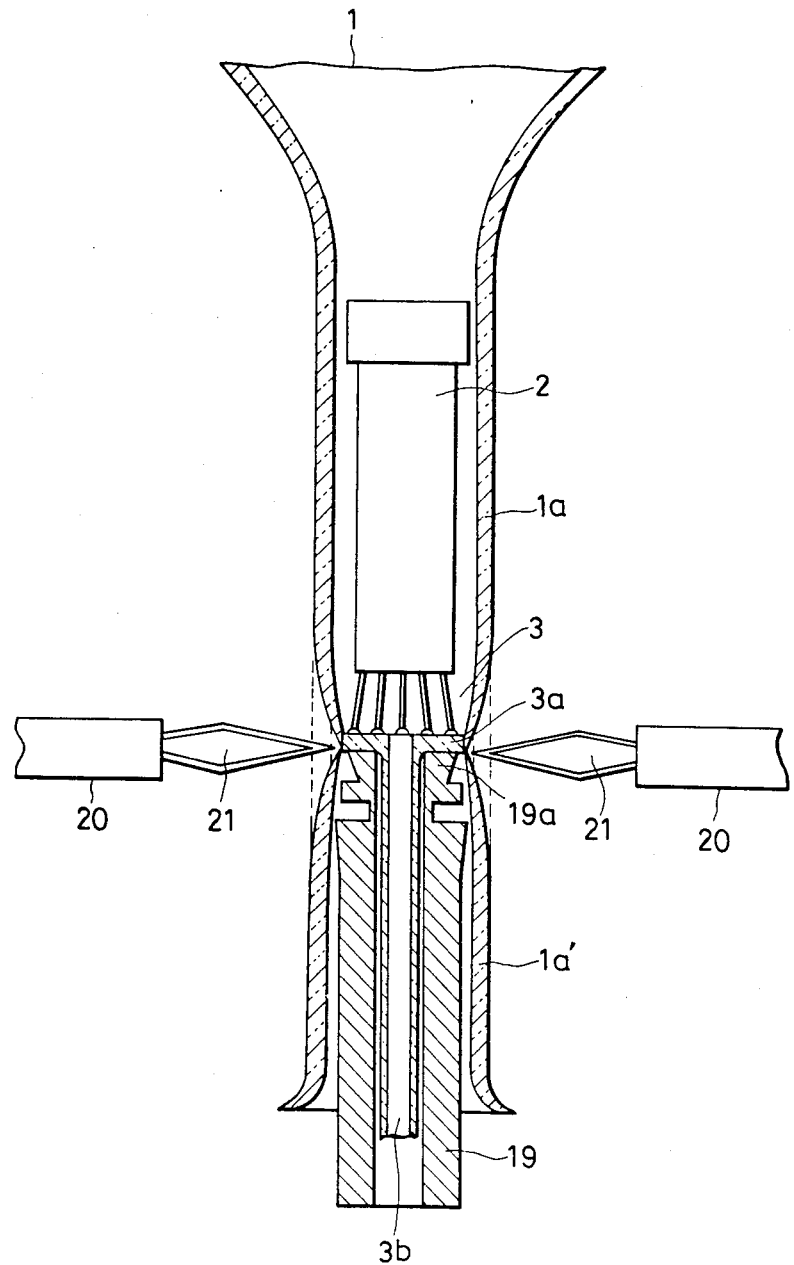
FIG. 4 is a schematic sectional view showing a situation of prior art sealing processing.

In the above-described constitution, the stem structure 3 mounted with the electron gun structure 2 is, as illustrated in FIG. 3, installed on the mount pin base 19a of the mount pin 19. After setting the direction, angle and height of the electron gun structure 2 to have predetermined values, the mount pin 19 is raised and the electron gun structure is inserted in the glass bulb neck portion 1a so as to be fixed in a preset position. In the wake of this step, the working head 25 is, as illustrated in FIG. 1, made to move forward in the direction shown by the arrow C; and at the same time the first and second block heaters 23a, 23b are opened in the directions pointed by the arrows B, B'. After reaching a predetermined location with respect to the directions indicated by the arrows C, C', these block heaters 23a, 23b are closed. In the state depicted by the solid lines of FIG. 1, the outer surface of the bulb neck portion 1a is closely surrounded by the block heaters 23a, 23b and is heated up to a preset temperature. The bulb neck portion 1a is thus heated for a predetermined period of time to such an extent that the temperature thereof reaches a preset value. Subsequently, the first and second block heaters 23a, 23b are opened in the directions pointed by the arrows B, B', whereby the working head 24 moves back in the direction shown by the arrow C' and reverts to the initial position. Subsequently, the index table 10 moves by one step in the direction of the arrow A, and the next bulb neck portion (not illustrated) is to be heated in the same manner as the previous one. Broken lines in FIG. 1 show a state in which the working head moves in the direction C'.

According to such a constitution, since desired parts of the bulb neck portion 1a are encompassed with the first and second block heaters 23a, 23b and are heated by them, it is feasible to perform surely the heat-processing with high efficiency without undergoing influences of the external disturbances of airflow, for example, convection caused by hot air or combustion gas.

The working heads 25 are so disposed on the outside of the index table 10 as to correspond to a plurality of the mount pins 19. It becomes possible to set the temperatures of the bulb neck portion 1a and its sealing portions in steps from high temperature to low temperature and from low one to high one by having each working head heat at a relatively different temperature. It is therefore feasible to effect the heat processing with high efficiency and simultaneously improve the heating efficiency. This constitution is extremely suitable especially for sealing the glass bulb having the culletless neck portion.

As can be clarified from the description so far made, the present invention yields the following favorable results. There are provided working heads each consisting of the driver part for moving the heater unit outside the index table before or the very moment the table begins to rotate and for moving this unit onto a position over the table just when the rotation of the table is halted during indexing, and of the heater unit, driven by the driver part, which surrounds the entire periphery of the bulb neck portion uniformly and heats this neck portion during the time the rotation of the table is halted. With this arrangement, it is possible to effect the heat processing with high efficiency in a highly accurate manner and thereby to undergo no influence because of external disturbances. Moreover, the sealing of high quality will be feasible.

What is claimed is:

1. A culletless sealing apparatus for picture tubes, comprising at least:

a plurality of bulb holders, each one for holding a glass bulb having a culletless neck portion, with the tube-axis of each bulb being centered, in the respective bulb holder;

a circular index table having said plurality of bulb holders circumferentially disposed on the outer peripheral portion thereof and with equal spacings therebetween, said index table being mounted for rotation so as to be indexed about its center at a specified pitch and in a given direction;

a plurality of mount pins, each associated with a respective bulb holder and disposed on said index table and having a respective stem structure and an electron gun structure loaded thereon and a discharging pipe provided thereunder; and a plurality of working heads, each for effecting heat processing uniformly on said stem structure and on a respective glass bulb neck portion, wherein each of said working heads includes a heater unit and driver means for moving a respective heater unit outside said index table at least by the time said index table begins to rotate and for moving said heater unit onto a position over said index table when the rotation halts during said indexing, so that after being moved by said driver part onto a position over said index table, said heater unit surrounds almost the entire periphery of said bulb neck portion so as to heat said bulb neck portion while the rotation of said index table is halted, wherein said heater unit includes two diametrically shaped semicircular block heaters each having an inside diameter substantially identical with an outside diameter of said bulb neck portion when said heater is in a closed and operating position and including an outer diameter, said block heaters each opening and closing substantially in the direction of a tangential line of the outer periphery of said index table in response to said driver means, and wherein each said working head heater unit for heating the neck portion and for effecting sealing of the sealing portion of said bulb generating different relative temperatures as the respective bulb is moved from one working head position to another position by the rotation of said index table, wherein the heating and sealing is done in gradual steps from low temperature to high temperature and then from high temperature to low temperature.

2. A culletless sealing apparatus for picture tubes according to claim 1, wherein at least one of said heater units including a plurality of burners for a glass softening process and at least one other of said heater units including a blast generator for preheating and/or annealing processes.

3. A culletless sealing apparatus for picture tubes according to claim 1, wherein said plurality of working heads have at least one of said heater units equipped with burners and at least one heater unit equipped with a hot blast generator.

4. A culletless sealing apparatus for picture tubes according to claim 1, wherein said plurality of working heads have at least one heater unit equipped with burners.

5. A culletless sealing apparatus for picture tubes according to claim 1, wherein said plurality of working heads have at least one heater unit equipped with a hot blast generator.

* * * * *